(12) United States Patent
Zhu et al.

(10) Patent No.: US 7,002,779 B2
(45) Date of Patent: Feb. 21, 2006

(54) THERMAL POLE-TIP RECESSION/SLIDE SHAPE VARIATION REDUCTION

(75) Inventors: Jianxin Zhu, Eagan, MN (US); Lance Eugene Stover, Eden Prairie, MN (US); Gordon Merle Jones, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 162 days.

(21) Appl. No.: 10/326,241

(22) Filed: Dec. 19, 2002

(65) Prior Publication Data

US 2003/0206370 A1 Nov. 6, 2003

Related U.S. Application Data

(60) Provisional application No. 60/377,139, filed on May 2, 2002.

(51) Int. Cl.
*G11B 21/20* (2006.01)

(52) U.S. Cl. .................................................. 360/234.5

(58) Field of Classification Search ................. 360/128, 360/245.8, 234.5
See application file for complete search history.

(56) References Cited

U.S. PATENT DOCUMENTS

| | | | |
|---|---|---|---|
| 4,022,641 A | 5/1977 | Lindberg | 216/14 |
| 4,154,877 A | 5/1979 | Vratny | 427/328 |
| 5,084,299 A | 1/1992 | Hirsch et al. | 427/556 |
| 5,570,249 A * | 10/1996 | Aoyagi et al. | 360/244.2 |
| 5,710,683 A | 1/1998 | Sundaram | 360/126 |
| 5,731,243 A | 3/1998 | Peng et al. | 438/612 |
| 5,771,138 A * | 6/1998 | Zarouri et al. | 360/234.5 |
| 5,796,549 A * | 8/1998 | Sedbrook et al. | 360/234.5 |
| 5,808,834 A * | 9/1998 | Jurgenson | 360/234.5 |
| 5,859,748 A | 1/1999 | Itoh | 360/246.2 |
| 5,894,380 A * | 4/1999 | Sasada et al. | 360/234.5 |
| 6,165,886 A | 12/2000 | Lin et al. | 438/612 |
| 6,177,636 B1 * | 1/2001 | Fjelstad | 174/267 |

* cited by examiner

*Primary Examiner*—David Davis

(57) ABSTRACT

A bond pad is elevated from a slider body by a conductive post. The bond pad is disposed atop the post, which typically possesses a cross-sectional area smaller than the surface are of the bond pad. Thus, rather than having the entire surface of the bond pad in contact with the slider body, only the cross-sectional area of the conductive post is in contact therewith. Alternatively, a bond pad may be split into two electrically coupled pads: one pad used for housing a permanent bond, and a second pad used for housing a temporary bond. The pad used to house the temporary wire bond may be disposed atop a sacrificial layer. After a lapping process, the sacrificial layer may be etched away, thereby permitting the temporary pad to be removed.

17 Claims, 8 Drawing Sheets

THERMAL POLE-TIP RECESSION/SLIDE SHAPE VARIATION REDUCTION

RELATED APPLICATIONS

This application claims priority of U.S. provisional application Ser. No. 60/377,139, filed May 2, 2002 and entitled "THERMAL PTR/SLIDER SHAPE VARIATION REDUCTION METHOD."

FIELD OF THE INVENTION

This application relates generally to an apparatus and method for reduction of thermally induced shape distortion of an electronic device, and more particularly to reduction of pole-tip recession in a slider used in a storage device.

BACKGROUND OF THE INVENTION

The storage medium for a disc drive is a flat, circular disc capable of retaining localized magnetic fields. The data that are stored upon the disc find physical representation through these localized magnetic fields. The data are arranged on the disc in concentric, circular paths known as tracks.

The localized magnetic fields can be detected by a magnetically sensitive element ("a read element") when they are brought in close proximity to the element. During operation the disc continually rotates, meaning that for each rotation, a read element fixed a given radius from the center of the disc would encounter every localized magnetic field along a given track. Altering the radial coordinate of the read element allows the head to read or write data along a different track.

The magnetically sensitive element responsible for reading the localized magnetic fields is located in a device known as a "slider" (the write element is also housed in the slider). A slider is a device attached to a gimbal tongue, which is, in turn, attached at a load point to the distal end of an actuator arm. The slider has an air bearing surface that is shaped so as to cause the slider to literally float at a small distance over the surface of the disc, when the disc is rotating. For the read element to properly detect the localized magnetic fields as they pass beneath it, the read element must be maintained at a proper height above the surface of the disc. If the read element floats at a distance that is too great, the read element may not detect each field as it passes beneath the element. On the other hand, if the read element is too close to the disc, the read element may become overly saturated.

One factor that affects the distance between a read element and the surface of a disc is the tendency of a slider to warp over time. As a slider warps, the read element (which is a part of the slider) is moved either toward or away from the edge of the slider that is to float above the disc. Consequently, even if the slider were to float at the same distance from disc as it did before it became warped, the read element, itself, would be either closer or further from the disc. In short, warping of the slider affects the position of the read element relative to the geometry of the slider.

As is made evident from the foregoing discussion, there exists a need for a scheme by which slider warpage may be minimized. By minimizing slider warpage, a disc may be read from and written to with increased reliability.

SUMMARY OF THE INVENTION

Against this backdrop the present embodiments have been developed. An electronic device in accordance with the invention may include the following. The device may include a substrate upon which a plurality of conductive, dielectric, or semiconductive materials are disposed. The layers define an electronic component embedded beneath an outer surface of the device. The layers further defining a conductive path connected to the electronic component and electrically accessible from an outer surface of the device. A conductive mass may be located outwardly from the outer surface of the device. The conductive mass may have oppositely disposed first and second surfaces. A wire may be bonded to a bond area on the first surface of the conductive mass. A portion of the second surface of the conductive mass is in contact with the outer surface of the device. Finally, the area of contact between the second surface of the conductive mass and the outer surface of the device is not substantially larger than the bond area.

According to another embodiment of the invention, a slider may have a slider body with a read element embedded therein. The slider body has an outer surface. A conductive path may extend between the read element and a bond pad disposed atop the outer surface of the slider body. The bond pad may have a bonding surface. A wire may be bonded to a bond area on the bond pad. The bonding surface is not substantially larger than the bond area.

According to another aspect of the invention, a slider may have a slider body with a read element embedded therein. The slider body has an outer surface. A conductive path may extend between the read element and a conductive post protruding from the outer surface of the slider body. A bond pad may be disposed atop the conductive post. The bond pad has a bonding surface. A wire may be bonded to a bond area on the bonding surface.

According to another embodiment of the invention, a method of fabricating a bonding pad on a device surface may include the following steps. A sacrificial layer may be deposited atop a region. A conductive bond pad may be deposited at least partially atop the sacrificial layer. The conductive bond pad is in electrical contact with a conductive path connecting to an electronic component embedded in the device. The sacrificial layer is etched away.

These and various other features as well as advantages which characterize the present invention will be apparent from a reading of the following detailed description and a review of the associated drawings.

DETAILED DESCRIPTION

Figure 1:
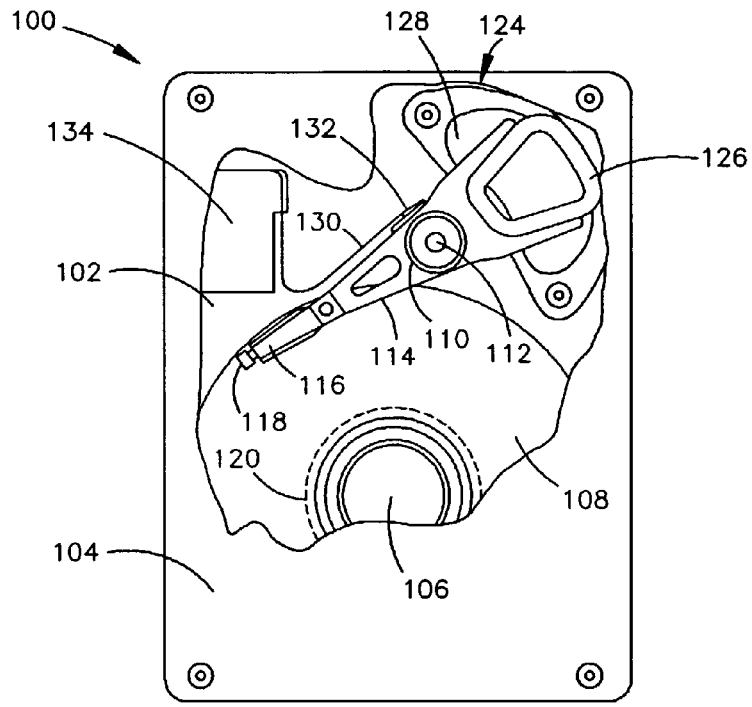
FIG. 1 is a schematic representation of a disc drive in accordance with a preferred embodiment of the invention.

Slider warpage is caused, in large part, by strain imparted upon the slider body from bond pads attached thereto. As electrical current is passed through a bond pad, the bond pad grows warm, and therefore expands. The expansion of the bond pad results in strain upon the slider body, because the bond pad is attached to the slider body. Armed with this insight into slider warpage, it is evident that reducing the surface area between a bond pad and the slider to which it is attached results in less strain upon the slider and a concomitant reduction in warpage.

Surface area between a bond pad and a slider can be reduced by the following scheme. The bond pad can be elevated from the slider body by a conductive post. Per such a scheme, the bond pad is perched atop the post, which typically possesses a cross-sectional area smaller than the surface are of the bond pad (the periphery of the bond pad overhangs the supporting conductive post). Thus, rather than having the entire surface of the bond pad in contact with the slider body, only the cross-sectional area of the conductive post is in contact therewith.

Another scheme makes use of the fact that the bond pads on a slider have more surface area than is needed to house the permanent wire bond connected thereto. Each bond pad on a slider is electrically coupled to a conductive path leading either to or from a read or write element. The read/write circuitry of a disc drive is connected to the read and write elements by wires leading from the read/write circuitry to bond pads electrically coupled to either the read or write element. During manufacture of the slider, the slider undergoes a lapping process wherein the read element is eroded by an abrasive slurry. The purpose of the lapping process is to reduce the read element to a proper stripe height (so that the magnetic sensitivity of the read element is within a proper range). During lapping, an electrical current is conducted through the read element. The current is driven through a pair of wires that are temporarily bonded to bond pads that are, in turn, connected to electrical pathways leading to and from the read element. After lapping, the wires supplying the current are removed. At a subsequent stage of manufacture, wires permanently joining the read element and the read circuitry are bonded to the same bond pads. Unfortunately, the permanent wires cannot be bonded to the same region of the bond pads as had been occupied by the wires temporarily bonded thereto during lapping (re-moval of the temporary wires leaves the region unclean and therefore unsuitable for reliable wirebonding). Thus, here-tofore, each bond pad has been forced to have a surface area large enough to accommodate two wire bonds: (1) a per-manent wirebond to connect the read/write element to the read/write circuitry; and (2) a temporary wirebond used to conduct a current through the read/write element during lapping.

Each bond pad may be split into two electrically coupled pads—one pad used for housing the permanent bond, and a second pad used for housing the temporary bond. The pad used to house the temporary wire bond may be disposed atop a sacrificial layer. After the lapping process, the sacrificial layer may be etched away, thereby permitting the pad to be removed. Consequently, the pad housing the temporary bond is rendered temporary, itself. After removal of the pad housing the temporary bond, the slider is left with its surface contacting only the pads housing the permanent bonds-an effective reduction of contact area of one-half.

Figure 2:
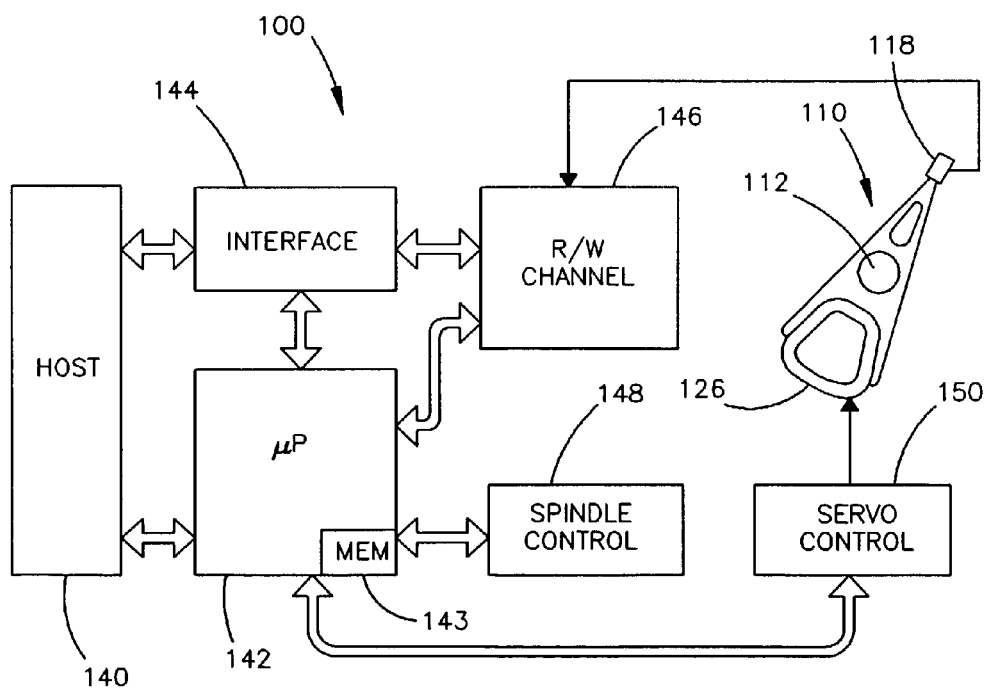
FIG. 2 illustrates a disc drive system connected to a host for the disc drive of FIG. 1.

In the disclosure that follows, the discussion related to FIGS. 1 and 2 is intended to familiarize the reader with disc drives generally. The discussion related to the remaining figures focuses more closely upon the invention, itself.

A disc drive 100 constructed in accordance with a pre-ferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114.

Mounted at the distal end of each of the flexures 116 is a head 118 which includes an air bearing slider enabling the head 118 to fly in close proximity above the corresponding surface of the associated disc 108. An air current created by the rotation of the disc 108 interacts with the air-bearing surface to provide the lifting force that permits the head 118 to float.

The position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allow-ing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

The disc drive 100 is shown in FIG. 2 to be operably connected to a host computer 140 in which the disc drive 100 is mounted in a conventional manner. Control commu-nication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a channel 146, which encodes and serializes the data and provides the requisite write current signals to the heads 118. To retrieve data that has been previously stored by the disc drive 100, read signals are generated by the heads 118 and provided to the channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3:
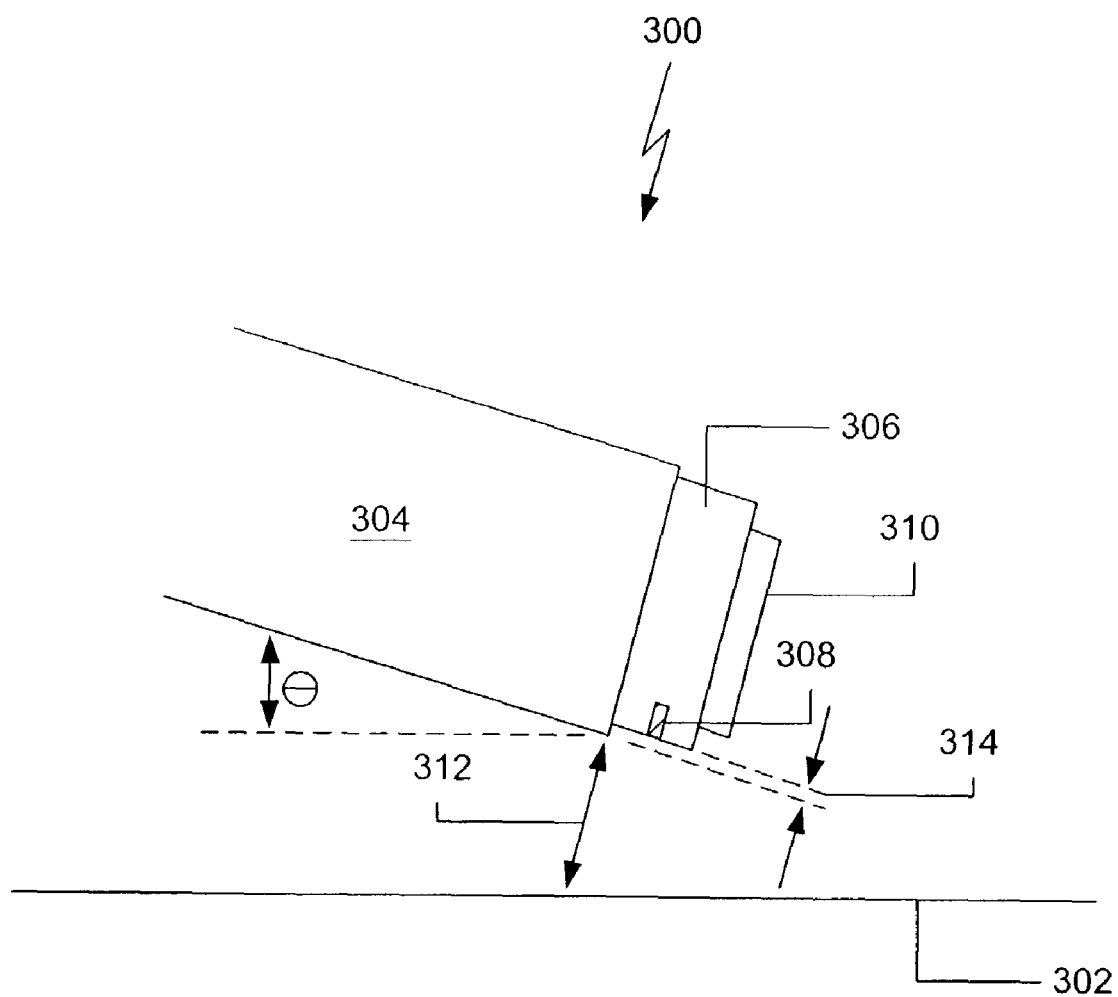
FIG. 3 depicts a side-view of a slider floating above the surface of a disc.

FIG. 3 depicts a side-view of a slider 300 floating above the surface of a disc 302. As can be seen from FIG. 3, the slider 300 is composed of a substrate 304 (generally composed of AlTiC, which is Aluminum, Titanium, and Carbide) upon which a plurality of layers of various conductive, semiconductive, and dielectric material are disposed. The various layers define a slider body and are depicted as a single unit identified by reference numeral 306 Embedded within the layers 306 is a read element 308. As shown in FIG. 3, the read element 308 is peripherally located, although the read element may also be centrally located. A bond pad 310 is disposed atop the various layers 306. Although not depicted in FIG. 3, a conductive path extends between the read element 308 and the bond pad 310. Consequently, the bond pad 310 and the read element 308 are electrically coupled.

During operation, the slider 300 floats above the disc surface 302 at an angle, $\theta$. In FIG. 3, the angle $\theta$ has been exaggerated for the sake of illustration. Typically, $\theta$ is quite small, within the range of $2° \geq \theta \geq 0.5°$. As discussed previously, the distance between the read element 308 and the disc surface 302 (the "head media spacing") is a critical dimension. Head media spacing must stay within a specified range for reliable reading and writing to and from the disc. Head media spacing is determined, in part, by shaping the air bearing surface of the slider 300 in such a way that when oriented over a rotating disc surface 302, a literal cushion of air is generated, lifting the slider 300 a given height from the disc. This height is termed the "fly height" and is identified in FIG. 3 by reference numeral 312. Also determining the head media spacing is the distance between the bottom edge of the read element 308 and the bottom edge of the substrate 304. This distance is known as the "pole-tip recession," and is identified by reference numeral 314. Thus, head media spacing is largely determined by the sum of the fly height and the pole-tip recession.

Head Media Spacing≈fly height+pole tip recession+lubricant thickness (constant)+ other factors Other factors also influence head media spacing, such as disc surface irregularities. But, the other factors have minimal influence on the head media spacing, as compared to fly height and pole-tip recession.

Pole-tip recession (and pole-tip protrusion) is influenced by linear thermal expansion of the materials forming the slider. Linear thermal expansion is given by the following equation Linear Thermal Expansion=$CE*\Delta T$, where CE is the thermal coefficient of the material. Typical values for gold are 15–16 $\mu$m/m° C. A typical value for Alumina is approximately 6 $\mu$m/m° C.

The conductive pad 310 may be made of a conductive metal, such as gold. On the other hand, the slider body 306 is made of many materials, but since its overcoat is composed of $Al_2O_3$, it too can thought of as being made of $Al_2O_3$. As electrical current is conducted through the bond pad 310, the geometry of the bond pad expands in accordance with the coefficient of thermal expansion corresponding to the particular metal used in the bond pad. The slider body 306, however, is not particularly thermally conductive and does not expand considerably by virtue temperature elevation. Nevertheless, because the slider body 306 and the bond pad 310 are in contact with one another, expansion of the bond pad 310 causes strain upon the slider body 306. In response to the strain, the slider body 306 warps and pole-tip recession is affected by such warpage. Accordingly, the head media spacing is influenced by the thermal expansion of the bond pad 310—a phenomenon inimical to the goal of constant head media spacing.

Based upon the foregoing discussion, it is clear that by reducing the surface area between a bond pad 310 and the slider body 306, the strain upon the slider body 306 (caused by thermal expansion of the bond pad 310) can be reduced. By virtue of reduction of thermal strain, thermal warpage and thermal pole-tip recession are also reduced.

Figure 4A:
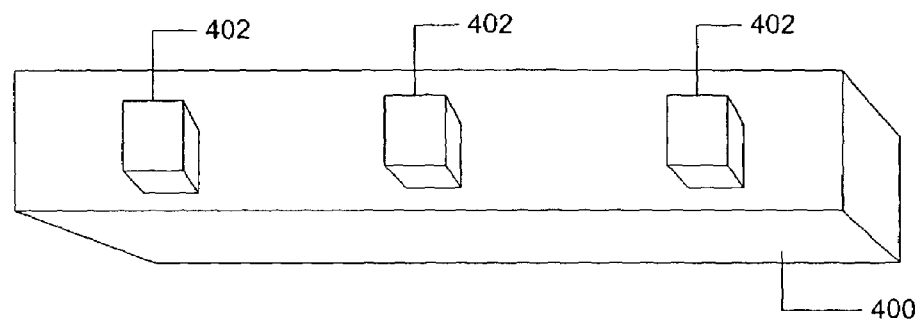
FIGS. 4A–4E depict a scheme by which contact area between a bond pad and a slider body may be reduced, according to one embodiment of the present invention.

FIGS. 4A–4E depict one scheme by which contact area between a bond pad and a slider body may be reduced, according to one embodiment of the present invention. FIG. 4A depicts a slider body 400 that has been prepared in accordance with the initial operation of a contact area reduction scheme. As can be seen from FIG. 4A, three conductive studs 402 (also referred to herein as conductive "posts") protrude from a first surface of the slider body 400. These conductive posts 402 extend downwardly (although not necessarily linearly) into the slider body 400. The portion of each post 402 contained within the slider body 400 is referred to as a conductive "path". Together, the conductive paths and posts 402 cooperate to form a conductive pathway leading to or from a read or write element contained within the slider body 400.

Figure 4B:
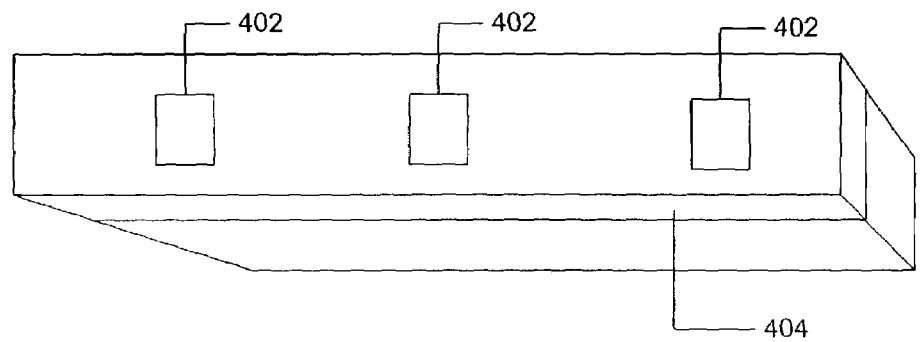
Figure 4C:
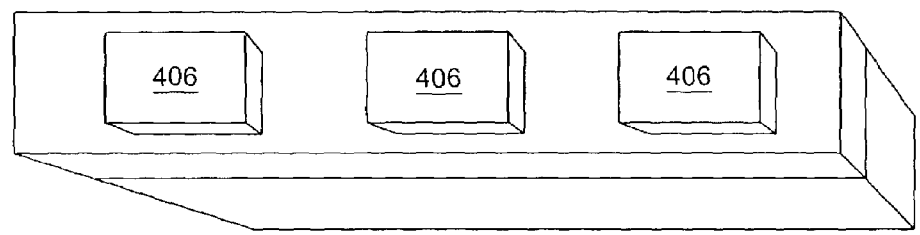

The next step in the scheme is to deposit a sacrificial layer 404 atop the structure depicted in FIG. 4A. The sacrificial layer may be made of Poly-Ge, $SiO_2$, or cured photoresist, to name a few possibilities. Thereafter, the resulting structure undergoes a chemical-mechanical polishing ("CMP") step to planarize the structure. The resulting structure is depicted in FIG. 4B. As can be seen from FIG. 4B, the top of each post 402 is substantially coplanar with the sacrificial layer 404, by virtue of having undergone the CMP process.

Next, a seed layer is deposited atop the structure shown in FIG. 4B. A seed layer is known in the art, and is not depicted in FIG. 4C. The purpose of a seed layer is to permit a metal to be deposited atop the seed layer (a metal conductor, such as gold, adheres to the seed layer, which, like gold, is conductive). Atop the regions of the seed layer located over the top of the posts 402, conductive bond pads 406 are deposited. The resulting structure is depicted FIG. 4C.

Figure 4D:
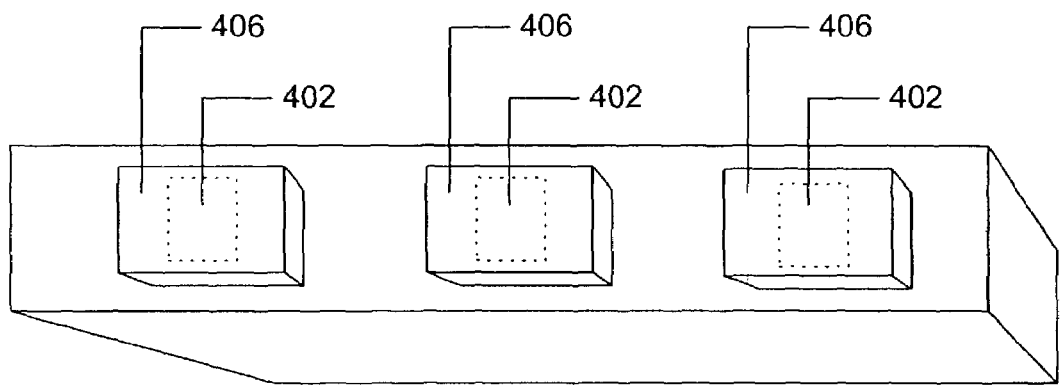
Figure 4E:
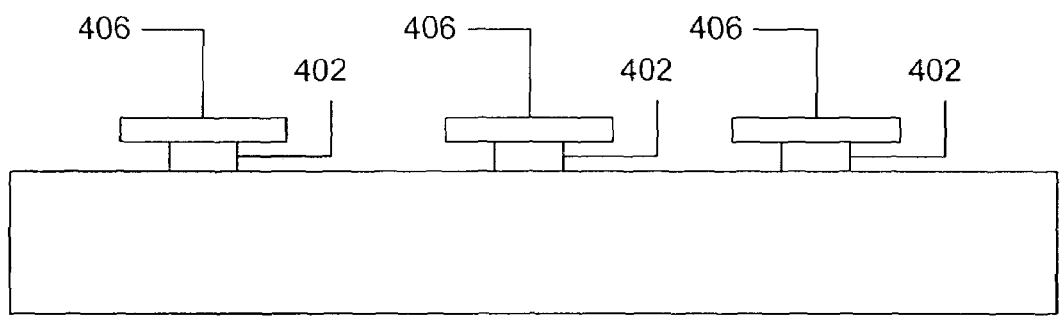

Finally, as shown in FIGS. 4D and 4E, the seed layer is etched away, and subsequently, the sacrificial layer is also etched away. The composition of the etchant used depends upon the composition of the sacrificial layer. For example, if poly-Ge is used as the sacrificial layer, then $NH_3OH+H_2O_2+H_2O$ may be used as the etchant. If $SiO_2$ is used as the sacrificial layer, then HF may be used as the etchant. Finally, if cured photoresist is used as the sacrificial layer, then aceton may be used as the etchant As a consequence of etching away the sacrificial layer 404, the bond pads 406 remain seated atop the conductive posts 402, as shown in perspective (FIG. 4D) and side view (FIG. 4E). Thus, rather than the entire surface area of the conductive pad 406 remaining in contact with the slider body 400, only the conductive post 402 remains in contact therewith. Preferably, the conduct post 402 has a cross-sectional area substantially smaller than that of the bond pad 406. For example, the cross-sectional are of the conductive post 402 may be less than one-half of that of the conductive pad 406. The bond pad 406, on the other hand, is free to have a relatively large surface area, so that it can house both a permanent bond and temporary bond (used during lapping).

To summarize the advantage of the above-described scheme, the contact area between the bond pad 406 and the slider body 402 is reduced. In the prior art, the bond pad had to have a surface area sufficient to house two bonds. Thus, the contact area between the bond pad and the slider body was approximately the size of two bond areas (a "bond area" is the surface area required to house a single bond, such as a ball bond or a wire bond). Per this embodiment, the contact area is reduced to be equal to that of the cross-sectional area of the post 402 (which is typically no larger than one bond area).

Figure 5A:
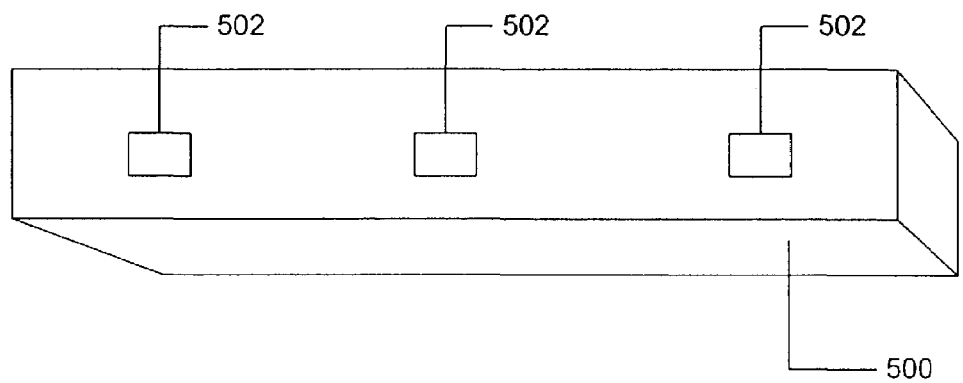
FIGS. 5A–5E depict another scheme by which contact area between a bond pad and a slider body may be reduced, according to one embodiment of the present invention.
Figure 5B:
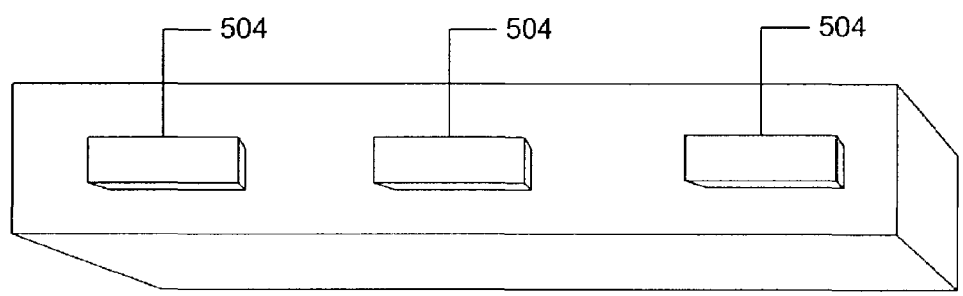

FIGS. 5A–5E depict another scheme by which the contact area between a bond pad and a slider body may be reduced. FIG. 5A depicts a slider body 500 that has been prepared in accordance with the initial operation of a contact area reduction scheme. As can be seen from FIG. 5A, the slider body 500 and conductive paths 502 have been planarized via a CMP process. Thereafter, a seed layer (not depicted) is deposited atop the structure of FIG. 5A, and conductive bond pads 504 are deposited atop the regions of the seed layer located over the top of the paths 502. The resulting structure is depicted in FIG. 5B. The bond pads 504 have a surface area sufficient to house only one wire bond—the permanent bond. Thus, the contact area between the bond pads 504 and the slider body 500 is not substantially larger than the bond area of the permanent bond (because the bond pad 504, itself, is designed not to be larger than necessary to house the single permanent bond). Certain forms of bonding require that the bond pad be larger than the bond area. For example, ball bonding usually requires that the bond pad be no smaller than twice the bond area. In such instances, the contact area is not substantially larger than twice the bond area.

Next, a sacrificial layer 506 is deposited atop the structure depicted in FIG. 5B, and the resulting structure is planarized (e.g., via a CMP process) so that the tops of the permanent bond pads 504 are substantially coplanar with the sacrificial layer 506. The resulting structure is depicted in FIG. 5C.

Figure 5C:
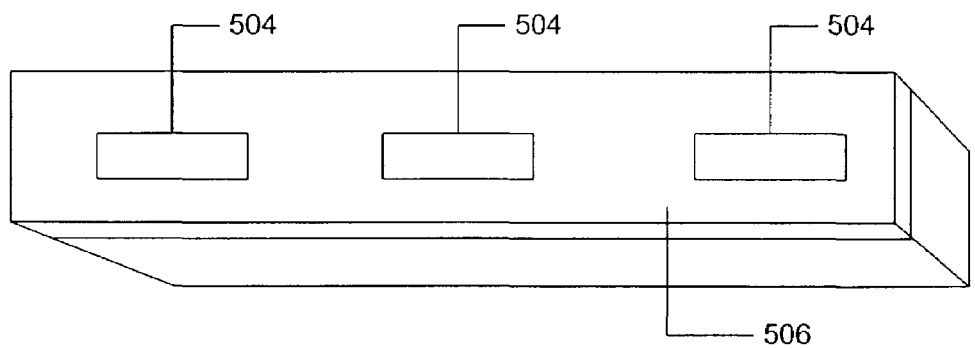
Figure 5D:
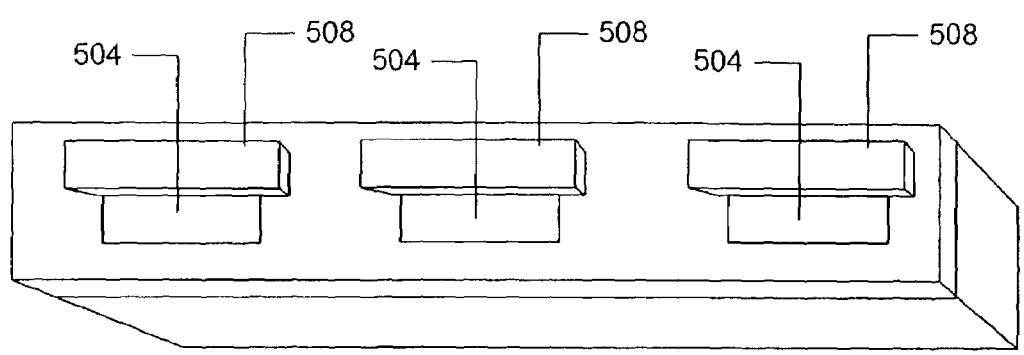

Thereafter, a seed layer (not depicted) is deposited atop the structure depicted in FIG. 5C, and bond pads 508 are deposited partially atop the sacrificial layer 506 and partially atop the permanent bond pads 504. The resulting structure is depicted in FIG. 5D. These newly deposited bond pads 508 are used for housing the wire bonds used during lapping, and are herein referred to as "temporary" bond pads. The temporary bond pads 508 cooperate with the permanent bond pads 504 and the conductive paths 502 to create a conductive pathway between extending to and from the read and write elements embedded in the slider body 500. Thus, during lapping, current may be driven through the temporary bond pads 508 and to the read or write elements (via the permanent bond pads 504 and conductive paths 502) embedded in the slider body 500.

Figure 5E:
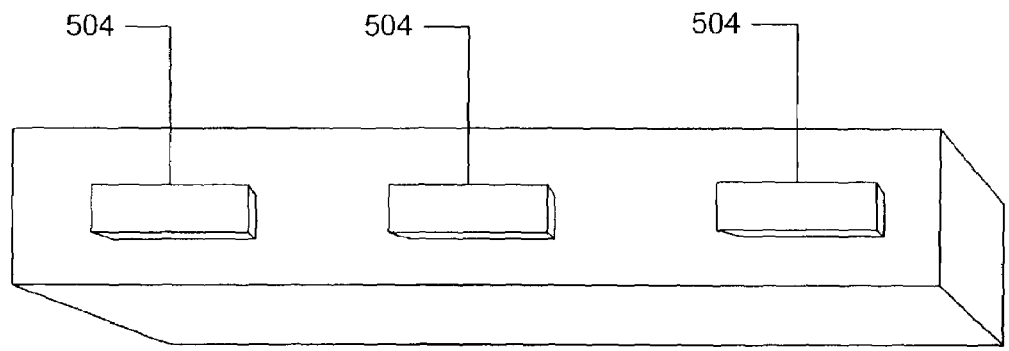

After lapping, the seed layer (not depicted) and the sacrificial layer 506 are etched away, allowing the temporary bond pads 508 (which sat partially atop the sacrificial layer 506) to be removed. Thus, the remaining structure is depicted in FIG. 5E As can be seen, only the permanent bond pads 504 remain. Thus, the contact area is effectively cut in half, by virtue of eliminating the temporary bond pads 508.

Figure 6A:
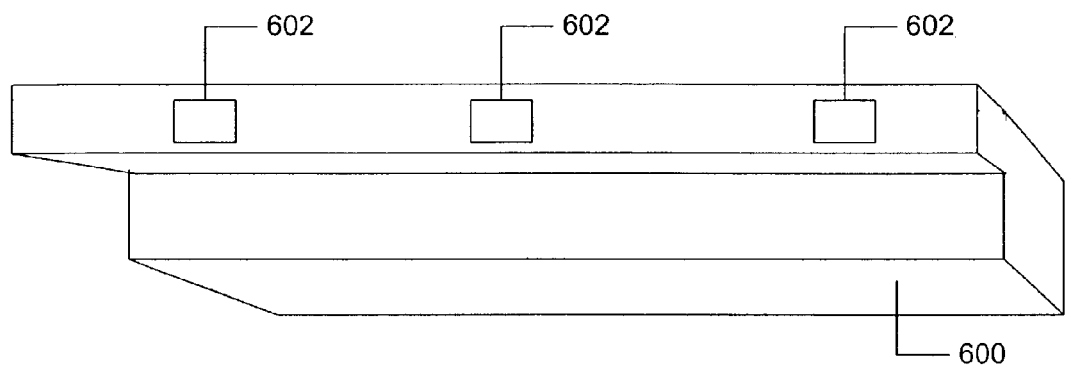
FIGS. 6A–6E depict yet another scheme by which contact area between a bond pad and a slider body may be reduced, according to one embodiment of the present invention.

FIGS. 6A–6E depict another scheme by which the contact area between a bond pad and a slider body may be reduced. FIG. 6A depicts a slider body 600 that has been prepared in accordance with the initial operation of a contact area reduction scheme. As can be seen from FIG. 6A, the slider body 600 has been patterned so as to have a step-shaped profile. Three conductive paths 602 are coplanar with the upper surface of the step-shaped surface. The conductive paths 602 extend downwardly into the slider body 600 and connect with the read and write elements embedded therein.

Next, a sacrificial layer 604 is deposited atop the structure depicted in FIG. 6A. The resulting structure is planarized (e.g., via a CMP process), so that the upper surface of the step-shaped surface, the sacrificial layer 604, and the top portions of the conductive paths 602 are substantially coplanar. The resulting structure is depicted in FIG. 6B.

Figure 6B:
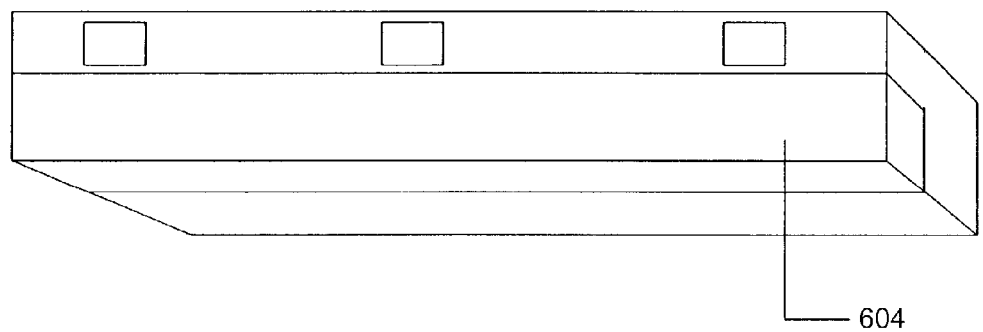
Figure 6C:
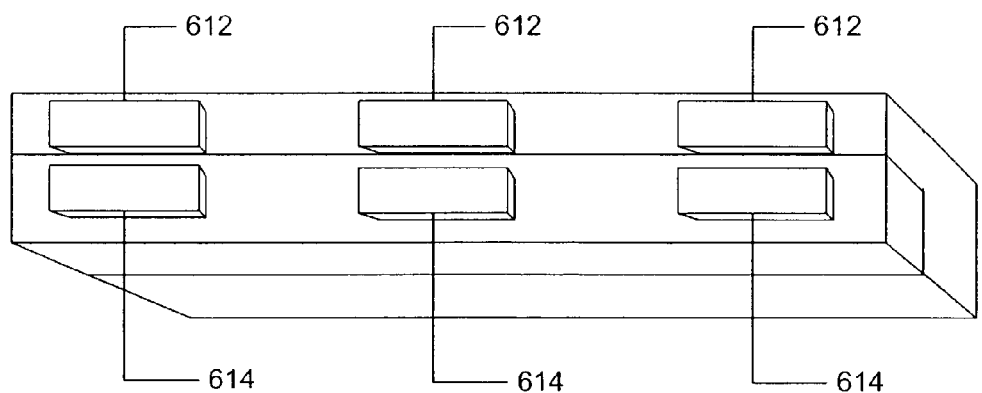

Thereafter, a seed layer is deposited atop the structure of FIG. 6B. The seed layer may be shaped as shown in FIG. 6E. As can be seen from FIG. 6E, the seed layer includes two large regions 606 and 608. Region 606 is deposited largely atop the upper portion of the step-shaped surface, and region 608 is deposited largely atop the sacrificial layer 604. A plurality of thin fingers 610 interconnect the two regions 606 and 608. Thus, by virtue of the interconnecting fingers 610, the two regions 606 and 608 are electrically coupled. After deposition of the seed layer of FIG. 6E, permanent bond pads 612 and temporary bond pads 614 are deposited. The permanent bond pads 612 are deposited atop region 606, while the temporary bond pads 614 are deposited atop region 608. The permanent and temporary bond pads 612 and 614 are electrically connected to the conductive paths 602 through the seed layer. Thus, during lapping, a current may be conducted through the temporary bond pads 612, the seed layer, and the conductive paths 602 to and from the embedded read and write elements.

Figure 6D:
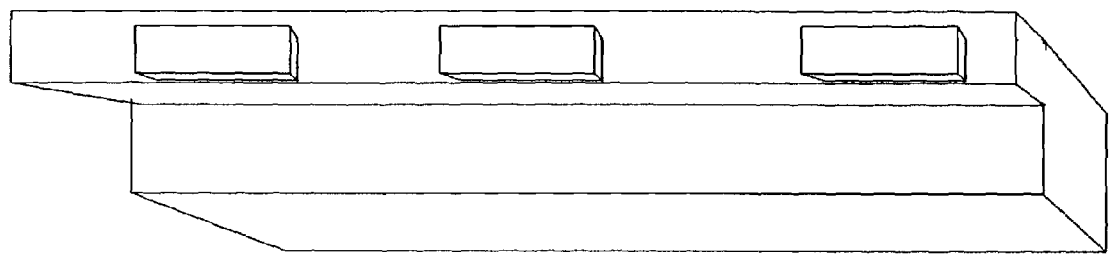
Figure 6E:
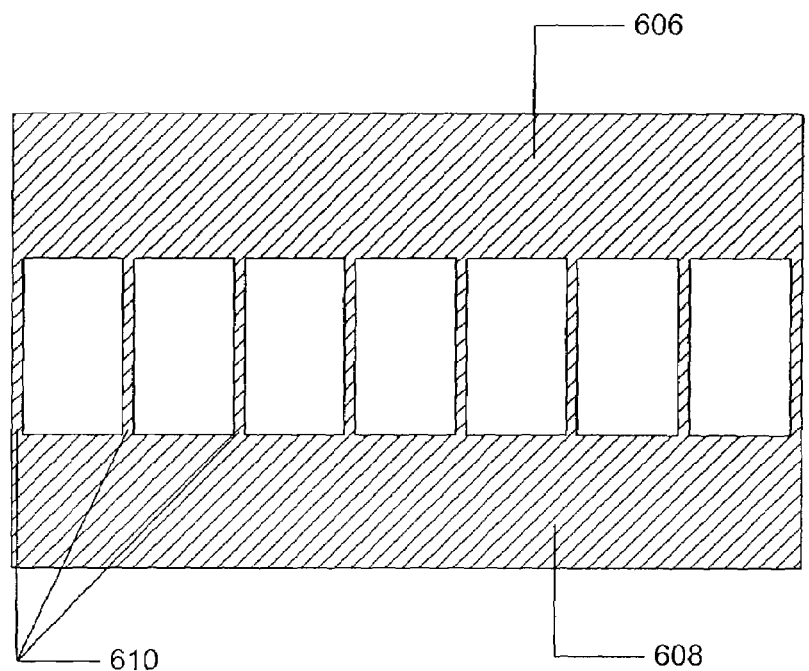

After lapping, the seed layer and sacrificial layer 604 may be etched away, leaving the structure of FIG. 6D remaining. This scheme reduces contact area in the same way as that described with reference to FIGS. 5A–5E—the temporary bonds are housed on bond pads 614 that are eventually removed, so that the contact area is effectively reduced by one-half.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, although this disclosure has discussed the invention with reference to a slider in a storage device, the invention can be applied to any electronic device with an electronic component embedded therein, if that device undergoes a manufacturing process wherein current must be supplied to the component. Additionally, other materials may be used for the sacrificial layer and corresponding etchant. Furthermore, other manners of arranging the sacrificial layer may be utilized. Numerous other changes may be made which will readily suggest themselves to those skilled in the art and which are encompassed in the invention disclosed and as defined in the appended claims.

What is claimed is:

1. A slider for use in a storage device, the slider having a read element embedded therein, the slider comprising:
    a slider body with a read element embedded therein, the slider body having an outer surface;
    a conductive path extending between the read element and a conductive post protruding out of the outer surface of the slider body;
    a bond pad disposed atop the conductive post, the bond pad having a bonding surface; and
    a bond area on the bonding surface.

2. The slider of claim 1, wherein the bonding surface is substantially larger than the bond area.

3. The slider of claim 1, wherein the bonding surface is at least twice as large as the bond area.

4. The slider of claim 1, wherein the conductive post has a cross-sectional area, and wherein the cross-sectional area is substantially smaller than the bonding surface.

5. The slider of claim 1, wherein the bond pad comprises gold.

6. The slider of claim 1, wherein the slider body includes at least two layers.

7. The slider of claim 6, wherein the at least two layers comprises at least one of a conductive material, a semiconductive material, or a dielectric material.

8. A storage device comprising:
    a slider body with a read element embedded therein, the body having an outer surface;
    a conductive path extending between the read element and a conductive post coming out of the outer surface of the body; and
    a pad disposed atop a distal end of the conductive post.

9. The storage device of claim 8, wherein the pad includes a bonding surface.

10. The storage device of claim 8, wherein the pad comprises gold.

11. The storage device of claim 8, wherein the slider body comprises at least one of a conductive material, a semiconductive material, or a dielectric material.

12. The storage device of claim 8, wherein the slider body includes at least two layers.

13. A slider comprising:
    a slider body having a read element within the slider body, the slider body having an outer surface;
    a conductive path connecting the read element and a conductive post coming out of the outer surface of the slider body; and
    a bond pad adjoined to a distal end of the conductive post.

14. The slider of claim 13, wherein the slider body comprises at least two layers.

15. The slider of claim 14, wherein the at least two layers includes at least one of a conductive material, a semiconductive material, or a dielectric material.

16. The slider of claim 13, wherein the slider body comprises at least one of a conductive material, a semiconductive material, or a dielectric material.

17. The slider of claim 13, wherein the bond pad comprises gold.

* * * * *